US012614933B2

(12) United States Patent
Yu et al.

(10) Patent No.: US 12,614,933 B2
(45) Date of Patent: Apr. 28, 2026

(54) LINEAR MOTOR COOLING MODULE

(71) Applicant: HIWIN MIKROSYSTEM CORP., Taichung City (TW)

(72) Inventors: Mu-Kai Yu, Taichung City (TW); Ruei-Bin Shiao, Taichung City (TW); Cheng-Te Chi, Taichung City (TW)

(73) Assignee: HIWIN MIKROSYSTEM CORP., Taichung City (TW)

( * ) Notice: Subject to any disclaimer, the term of this patent is extended or adjusted under 35 U.S.C. 154(b) by 386 days.

(21) Appl. No.: 18/520,267

(22) Filed: Nov. 27, 2023

(65) Prior Publication Data

US 2025/0175041 A1 May 29, 2025

(51) Int. Cl.
H02K 1/20 (2006.01)
H02K 41/02 (2006.01)

(52) U.S. Cl.
CPC .............. H02K 1/20 (2013.01); H02K 41/02 (2013.01); H02K 2213/03 (2013.01)

(58) Field of Classification Search
CPC ...... H02K 1/20; H02K 41/02; H02K 2213/03; H02K 5/203; H02K 3/24
See application file for complete search history.

(56) References Cited

U.S. PATENT DOCUMENTS 7,936,096 B2 * 5/2011 Shikayama ........ H02K 41/0356
310/12.29
2023/0283135 A1 * 9/2023 Wada ...................... H02K 3/34

FOREIGN PATENT DOCUMENTS

JP 2004260941 A 9/2004
JP 2021164193 A 10/2021

* cited by examiner

*Primary Examiner* — Christopher M Koehler
*Assistant Examiner* — Riley Owen Stout
(74) *Attorney, Agent, or Firm* — Guice Patents PLLC

(57) ABSTRACT

In a linear motor cooling module provided by the invention, mainly at least one spoiler element is provided in a flow channel, the spoiler element has a first protrusion and a second protrusion that are staggered with each other, each of the protrusions extends toward a center of the flow channel in opposite directions, so that a cooling fluid flowing through the spoiler element is blocked by the first protrusion and the second protrusion respectively, thereby forming a turbulence to improve uneven temperature distribution and poor cooling effect.

13 Claims, 17 Drawing Sheets

51

51

51

51

51C

517C

514C

516C

20D

23

24

W    Y

θ

L1

L2

LINEAR MOTOR COOLING MODULE

FIELD OF THE INVENTION

The invention relates to cooling technology, and more particularly to a linear motor cooling module.

DESCRIPTION OF THE RELATED ART

Linear motors usually generate a lot of heat during operation, so they require cooling to maintain the proper operating temperature. Coolant is commonly used to flow through the heat dissipation part of the motor to absorb the heat, and then take the heat away from the motor to keep the motor temperature controlled within an acceptable range.

However, the coolant usually flows too smoothly in the flow channel, and the temperature is higher in the part close to the motor and lower in the part far away from the motor, resulting in uneven temperature distribution and thus affecting the cooling effect.

For this reason, the Japanese patent application JP2021164193A discloses that a plurality of protrusions are provided in the flow channel to divide the coolant into multiple streams. The protrusions disclosed in the Japanese patent application JP2004260941A are in the shape of wings and are located at the corners of the flow channel, and are used to guide the flow direction of the coolant, but the flow state of the coolant disclosed in these patents does not cause significant turbulence, and there is still the problem of uneven temperature distribution.

SUMMARY OF THE INVENTION

Therefore, a main object of the invention is to provide a linear motor cooling module capable of generating a turbulence when a cooling fluid flows in order to improve the problems of uneven temperature distribution and poor cooling effect.

Therefore, in order to achieve the above object, a main technical feature of the linear motor cooling module provided by the invention is that at least one spoiler element is provided in a flow channel, the spoiler element has a first protrusion and a second protrusion that are staggered with each other, each of the protrusions extends toward a center of the flow channel in opposite directions, so that a cooling fluid flowing through the spoiler element is blocked by the first protrusion and the second protrusion respectively, thereby forming a turbulence.

In order to achieve the above technical feature, the linear motor cooling module further comprises a main body having a first plate part and a second plate part, and a first end face of the first plate part and a second end face of the second plate part overlap with each other in opposite directions along a direction of a virtual first axis. The flow channel is provided in the main body, a shape of the flow channel is defined between the first end face and the second end face, and the flow channel has a predetermined height (T) on the first axis; the spoiler element is located in the flow channel and has the first protrusion and the second protrusion, the first protrusion protrudes from the first end face and extends with a first height ($t_f$) toward the second end face along a direction of the first axis, and a first flow guide space is formed between an extended end of the first protrusion and the second end face, forward projections of the second protrusion and the first protrusion on the second end face along the first axis are protrudingly disposed on the second end face in a partially staggered manner, and the second protrusion extends with a second height ($t_r$) toward the first end face along a direction of the first axis, and a second flow guide space is formed between an extended end of the second protrusion and the first end face; wherein a sum of the first height ($t_f$) and the second height ($t_r$) is less than or equal to the height (T) of the flow channel; wherein contour shapes of the first protrusion and the second protrusion are symmetrical to each other, and the first protrusion and the second protrusion respectively comprise a first end, a second end and a connecting portion between the first end and the second end, a forward projection of the first end of the first protrusion on the second end face partially overlaps with the first end of the second protrusion, a forward projection of the second end of the first protrusion on the second end face and the second end of the second protrusion are staggered from each other, and a first flow guide plane is respectively provided at two back end sides of the first protrusion and second protrusion.

DETAILED DESCRIPTION OF THE INVENTION

Figure 1:
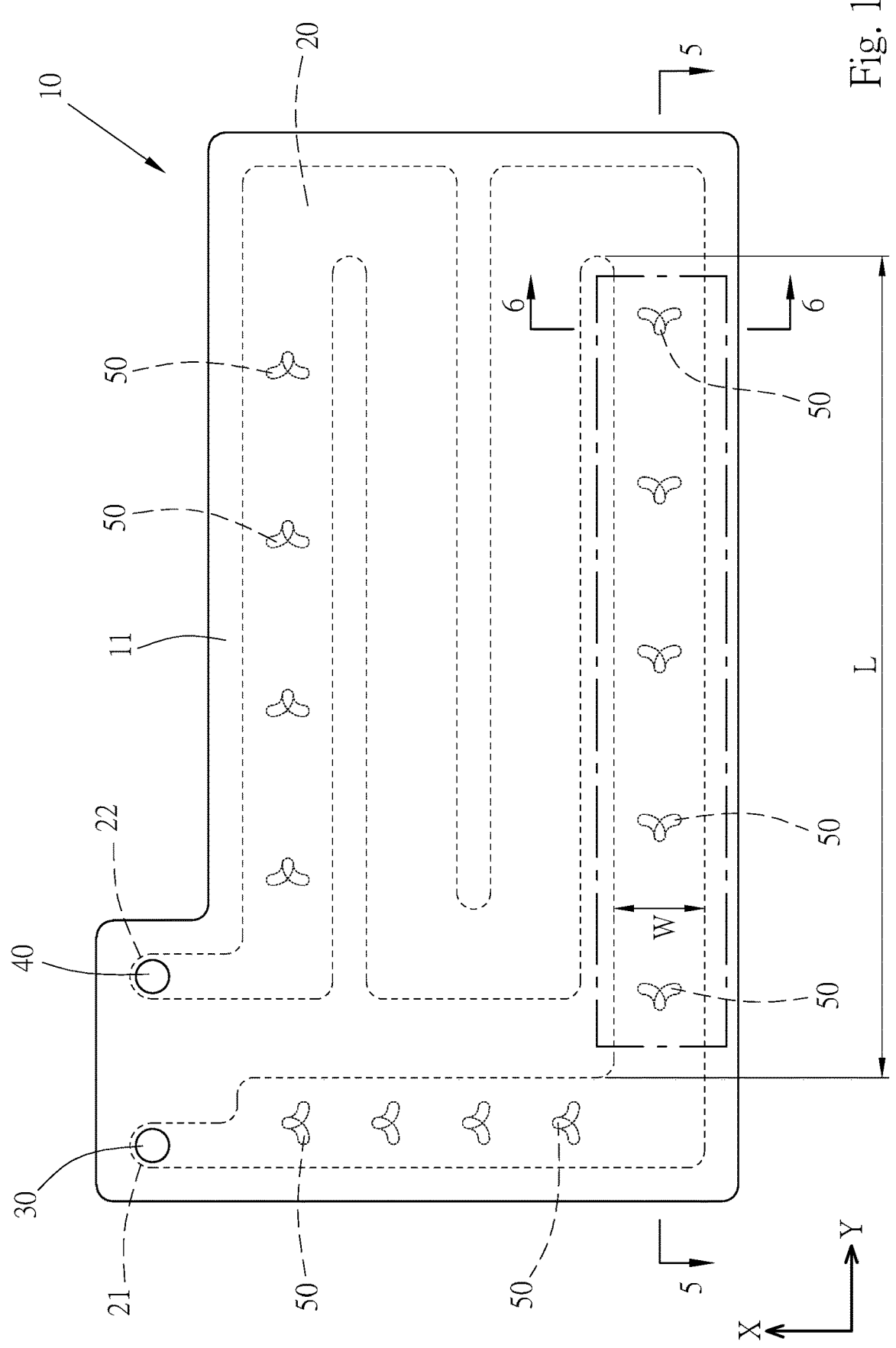
FIG. 1 is a schematic diagram of a linear motor cooling module according to a first embodiment of the invention.

Please refer to FIG. 1 to FIG. 9, which show a linear motor cooling module according to a first embodiment of the invention. The linear motor cooling module is used to be assembled on a linear motor (not shown in the figures) for heat dissipation and cooling. The linear motor cooling module comprises a main body (10), a flow channel (20), an inlet (30), an outlet (40) and a plurality of spoiler elements (50).

The main body (10) has a first plate part (11) and a second plate part (12), and a first end face (111) of the first plate part (11) and a second end face (121) of the second plate part (12) overlap with each other in opposite directions along a direction of a virtual first axis (Z).

The flow channel (20) is defined by grooves that are relatively concavely disposed on the first end face (111) and the second end face (121), and capable of extending arbitrarily in the main body (10), as shown in FIG. 1, that is, different sections of the flow channel (20) extend along a virtual second axis (Y) or a virtual third axis (X) respectively. The second axis (Y) and the third axis (X) are respectively perpendicular to the first axis (Z), and the second axis (Y) and the third axis (X) are respectively parallel to a plane formed by the first end face (111) or the second end face (121). The inlet (30) is provided on the first plate part (11) and communicates with a starting end (21) of the flow channel (20) and the main body (10) externally. The outlet (40) is provided on the first plate part (11) and communicates with an end (22) of the flow channel (20) and the main body (10) externally, and through communication between the inlet (30), the flow channel (20) and the outlet (40), a cooling fluid is capable of flowing therein.

However, for the convenience of description, only parts of the flow channel (20) in a dotted line frame in FIG. 1 will be described below. The flow channel (20) has a predetermined length (L) on the second axis (Y), has a predetermined width (W) on the third axis (X), and has a predetermined height (T) on the first axis (Z).

Figures 6A, 6B:
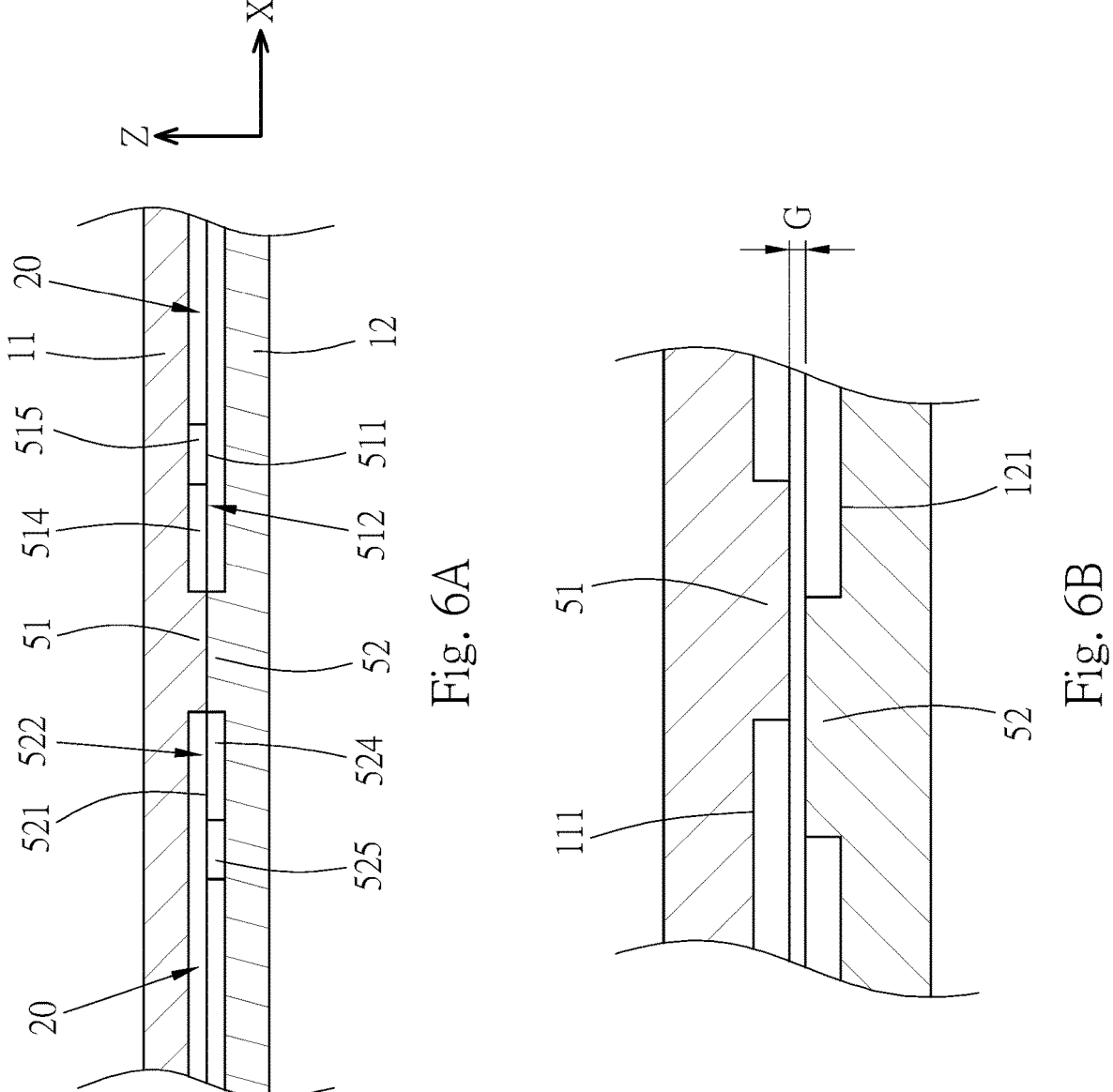
FIG. 6A is a cross-sectional view along section line 6-6 in FIG. 1.
FIG. 6B is a schematic diagram of another mode of FIG. 6A, which shows that there is a gap between the first protrusion and the second protrusion.
Figure 7:
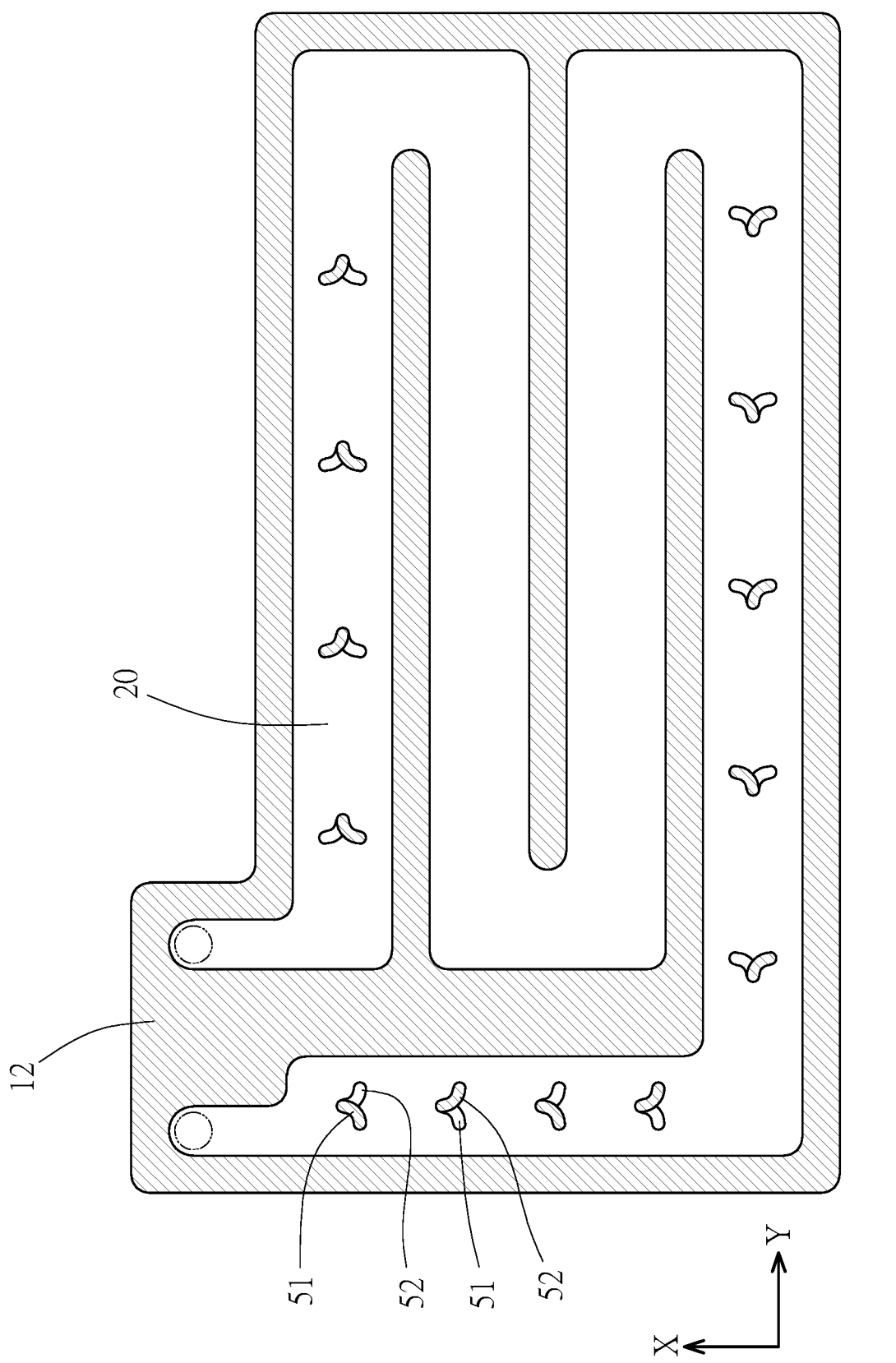
FIG. 7 is another cross-sectional view of FIG. 1.

The spoiler element (50) is located in the flow channel (20), and satisfies a condition that the length (L) of the flow channel (20) is greater than or equal to the width (W) of the flow channel (20). The spoiler element (50) has a first protrusion (51) and a second protrusion (52). The first protrusion (51) protrudes from the first end face (111) and extends with a first height (t$_f$) toward the second end face (121) along a direction of the first axis (Z), and a first flow guide space (512) is formed between an extended end (511) of the first protrusion (51) and the second end face (121). Forward projections of the second protrusion (52) and the first protrusion (51) on the second end face (121) along the first axis (Z) are protrudingly disposed on the second end face (121) in a partially staggered manner, and the second protrusion (52) extends with a second height (t$_r$) toward the first end face (111) along a direction of the first axis (Z), and a second flow guide space (522) is formed between an extended end (521) of the second protrusion (52) and the first end face (111). A sum of the first height (t$_f$) and the second height (t$_r$) is less than or equal to the height (T) of the flow channel (20) T). Further, as shown in FIGS. 6A and 6B, a spacing (G) between the extended end (511) of the first protrusion (51) and the extended end (521) of the second protrusion (52) on the first axis (Z), the first height (t$_f$), the second height (t$_r$) and the height (T) of the flow channel (20) satisfy the following formula (1):

$$G = T - (t_f + t_r), \text{ and } G \text{ can be } 0. \tag{1}$$

Figure 16:
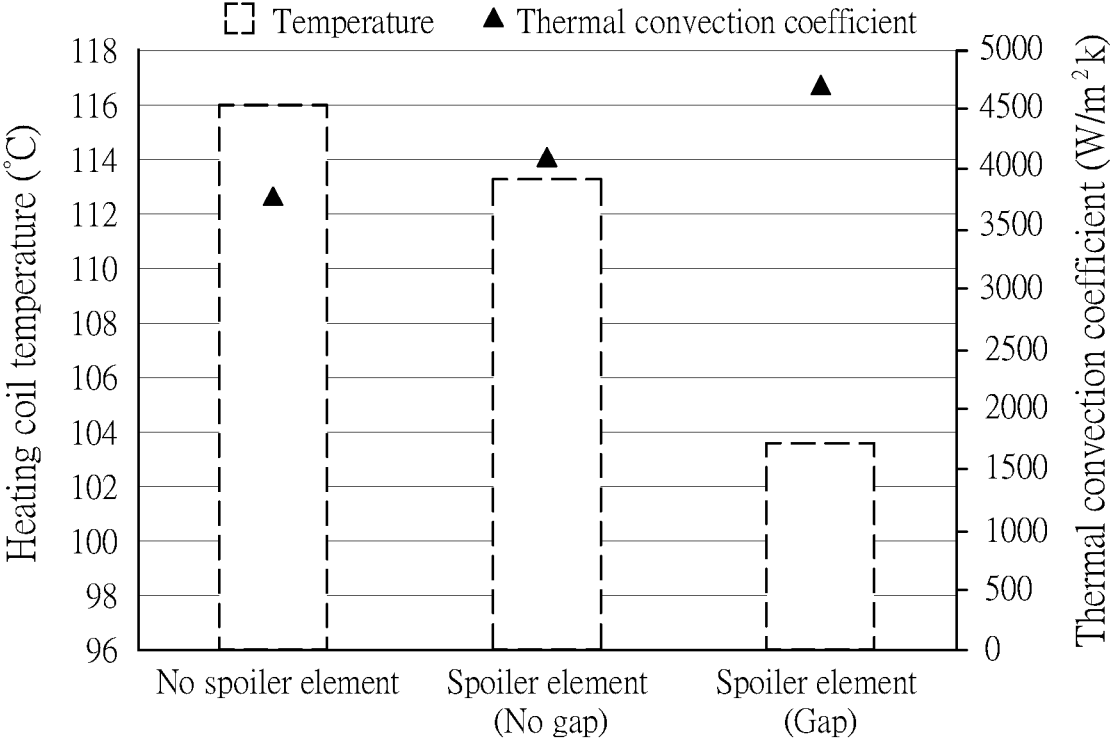
FIG. 16 is experimental data, which shows heat dissipation effect of the spoiler element with or without a gap.

In addition, if the first height (t$_f$) and the second height (t$_r$) are too small, a processing yield may be low, and it will be difficult to maintain an integrity of the spoiler element (50). For this reason, tests are conducted with or without the spoiler element (50), and the spacing (G) of the spoiler element (50) being 0 and the spacing (G) not being 0, and the experimental results are shown in FIG. 16. Therefore, the first height (t$_f$), the second height (t$_r$) and the height (T) of the flow channel (20) satisfy the following formula (2):

$$tf \geqq 0.2*T, tr \geqq 0.2*T, \alpha = \frac{t_f + t_r}{T}, \text{ and } \alpha \text{ is between } 0.4\sim1. \tag{2}$$

Figures 3, 4:
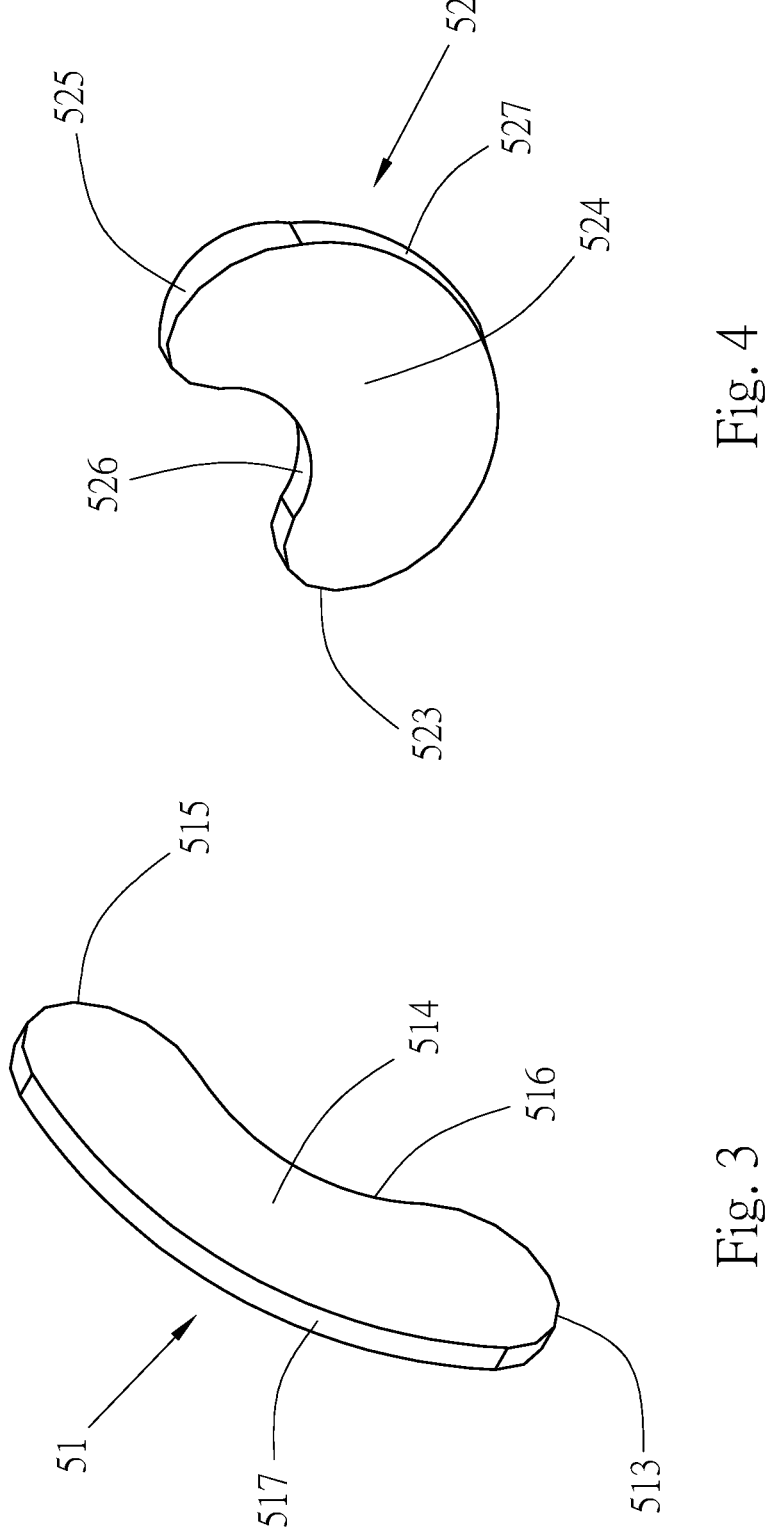
FIG. 3 is a perspective view of a first protrusion in FIG. 2.
FIG. 4 is a perspective view of a second protrusion in FIG. 2.
Figure 9:
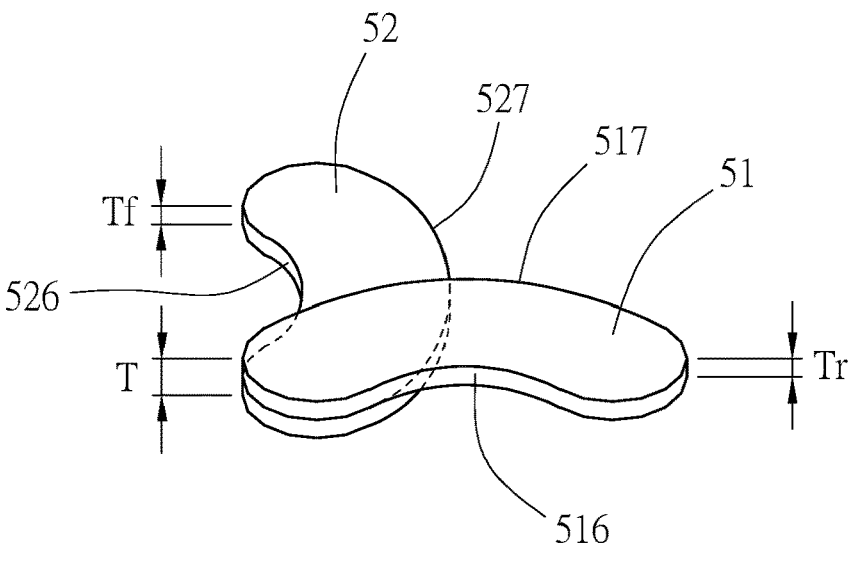
FIG. 9 is a perspective view of the spoiler element in FIG. 1.

The aforementioned dislocation refers to a positional relationship between the first protrusion (51) and the second protrusion (52), which can be, but is not limited to, staggered, interlace, etc., as shown in FIG. 3, FIG. 4 and FIG. 9. In this embodiment, contour shapes of the first protrusion (51) and the second protrusion (52) are symmetrically configured, and respectively comprise a first end (513,523), a connecting portion (514,524), a second end (515,525), a first flow guide plane (516,526) and a second flow guide plane (517,527). The connecting portion (514,524) is bridged between the first end (513,523) and the second end (515,525), two back end sides of the connecting portion (514,524) in an extension direction are respectively the first flow guide plane (516,526) and the second flow guide plane (517,527), and forward projections of the second flow guide plane (517) of the first protrusion (51) and the second flow guide plane (527) of the second protrusion (52) on the second end face (121) along the first axis (Z) are facing each other. Forward projections of the first flow guide plane (516) of the first protrusion (51) and the first flow guide plane (526) of the second protrusion (52) on the second end face (121) along the first axis (Z) are facing away from each other, as shown in FIG. 9. Each of the first flow guide planes (516,526) extends with a first radius of curvature, and each of the second flow guide planes (517,527) extends with a second radius of curvature.

Figure 10:
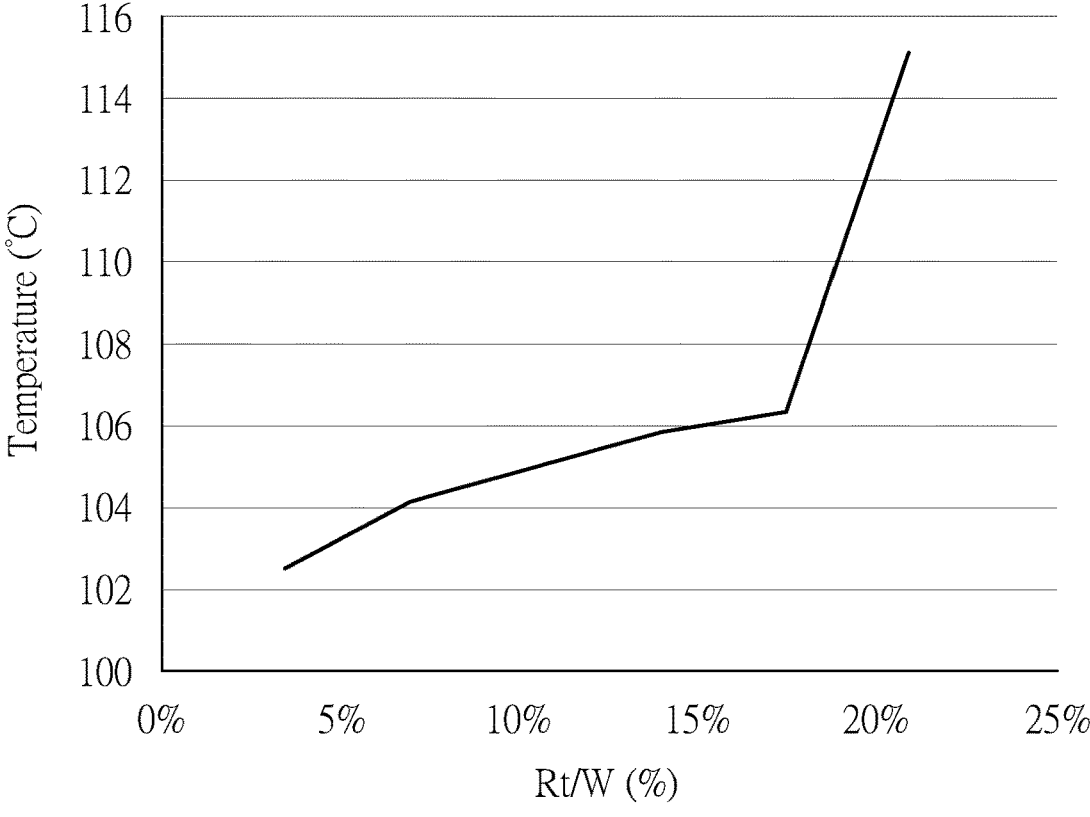
FIG. 10 is experimental data, which shows heat dissipation effect at different ratios between a radius (Rt) of a first circular structure and a width (W) of a flow channel.

Further, the first end (513) of the first protrusion (51) and the first end (523) of the second protrusion (52) are respectively a first circular structure on a cross section of the second axis (Y), forward projections thereof along the first axis (Z) on the second end face (121) overlap with each other, and the first circular structures have a same radius (Rt). In addition, according to the experimental results shown in FIG. 10, when a ratio of the radius (Rt) to the width (W) of the flow channel (20) is >18%, temperature increases significantly and heat dissipation effect is compromised. Moreover, if the radius (Rt) is too small, processing will be difficult and yield will decrease. Accordingly, the radius (Rt) and the width (W) of the flow channel (20) satisfy the following formula (3):

$$Rt/W \leq 18\%, \text{ and } Rt \geq 0.5 \text{ mm.} \tag{3}$$

Figure 11:
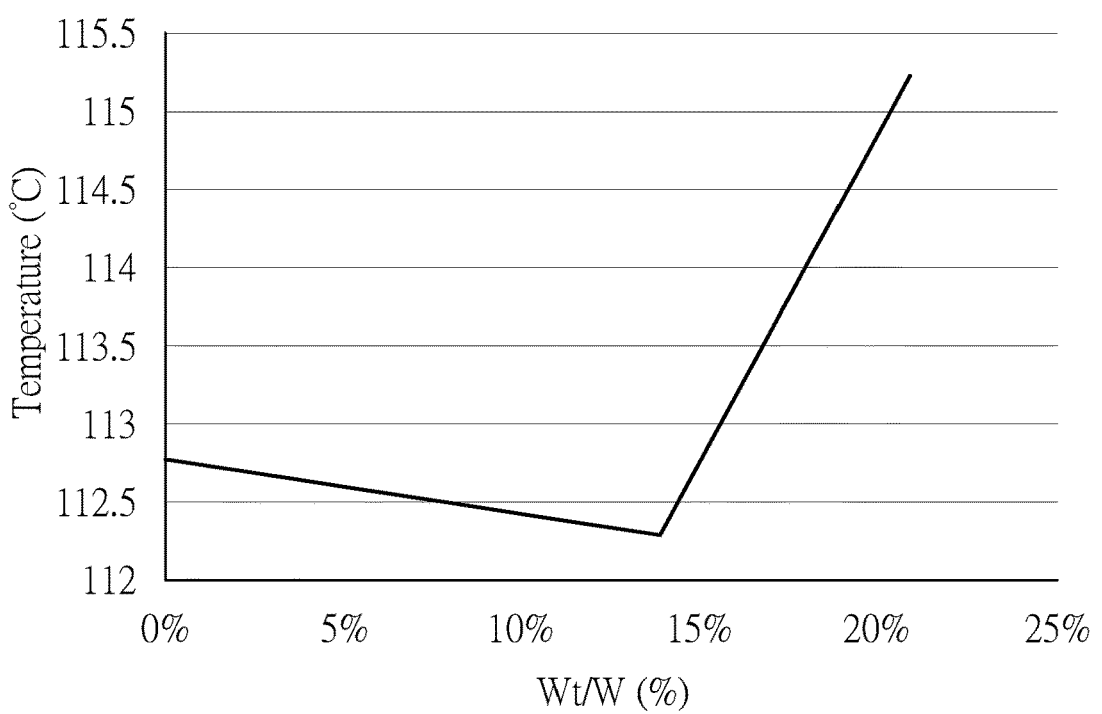
FIG. 11 is experimental data, which shows heat dissipation effect of the spoiler element at different positions on the flow channel.

According to the experimental results shown in FIG. 11, when a distance (Wt) between a geometric center of an overlap part between the first protrusion (51) and the second protrusion (52) and a center line (O) of the flow channel (20) parallel to the second axis (Y) is greater than or equal to 15% of the width (W) of the flow channel (20), temperature increases significantly. Accordingly, the distance (Wt) and the width (W) of the flow channel (20) satisfy the following formula (4):

$$0\% \leq Wt/W \leq 15\%. \tag{4}$$

In other words, a position of the spoiler element (50) is determined by the distance (Wt) when the center line (O) of the flow channel (20) moves toward the first end face (111) or the second end face (121), that is, calculation is based on W/2±Wt.

Figure 12:
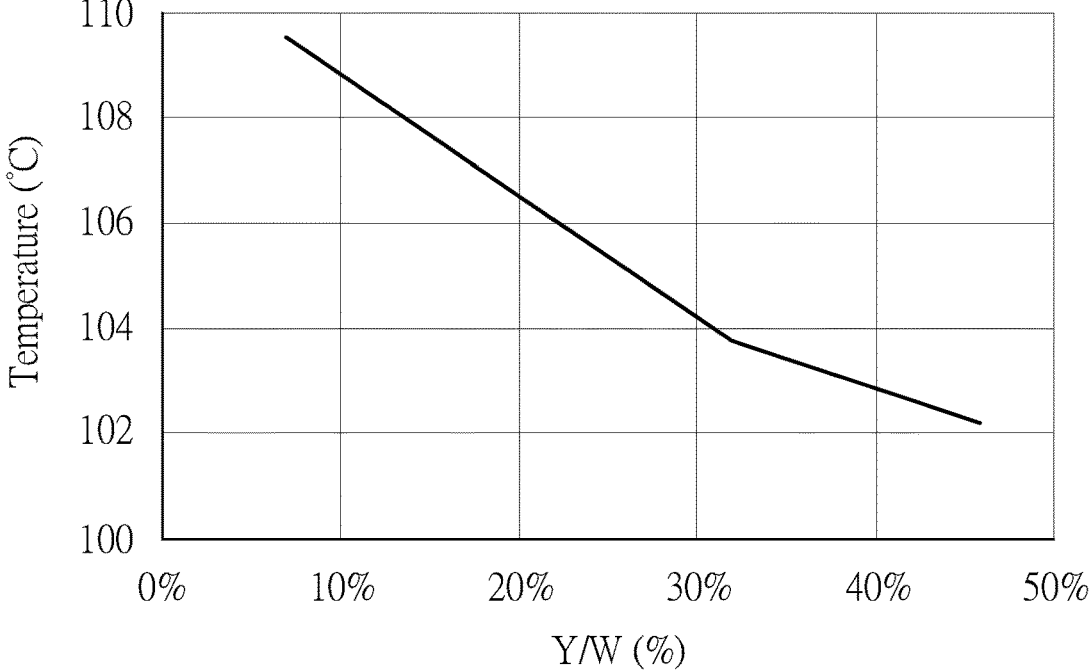
FIG. 12 is experimental data, which shows heat dissipation effect of the spoiler element of different sizes.

The second end (515) of the first protrusion (51) and the second end (525) of the second protrusion (52) respectively form a second circular structure on a cross section of the second axis (Y), the second circular structures have a same radius (Rh), and a forward projection of the second end (515) of the first protrusion (51) on the second end face (121) and the second end (525) of the second protrusion (52) are staggered from each other. According to the experimental results shown in FIG. 12, the higher a ratio between a distance (K) between the second end (515) of the first protrusion (51) and an imaginary line (F) of a geometric center of an overlap part between the first protrusion (51) and the second protrusion (52) extending along the second axis (Y) and a minimum distance (E) between the first end (513) and the second end (515) of the first protrusion (51) along the second axis (Y), the better a heat dissipation effect, but it is limited by specific sizes, so the distance (K) and the distance (E) satisfy the following formula (5):

$$E/K \geq 1. \tag{5}$$

Figure 17:
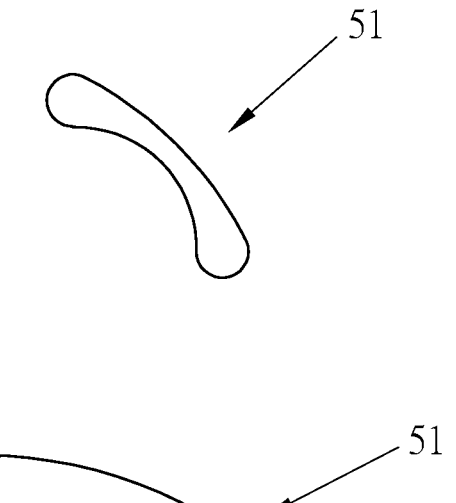
FIG. 17 shows different shapes of the first protrusion according to changes in a curvature of a connecting portion, a size of the connecting portion, a radius (Rt), and a radius (Rh).
Figure 17:
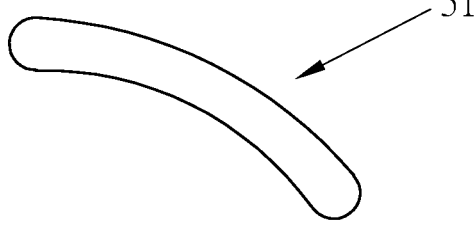
Figure 17:
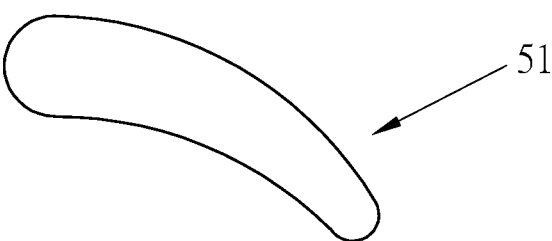
Figure 17:
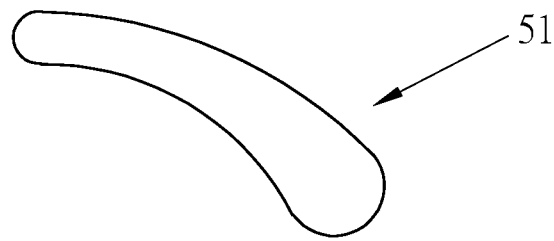

In addition, according to formulae (3) and (5), size change limits of various numerical values can be obtained, especially the radius (Rt), the width (W) of the flow channel (20), the first radius of curvature, the second radius of curvature and with changes in the radius (Rh), the spoiler elements (50) of different shapes can be obtained, such as several variations of the first protrusion (51) illustrated in FIG. 17, but the invention is not limited thereto. Wherein a limit range of the first radius of curvature is 1.25 Rt≤first radius of curvature≤60 Rt, and a limit range of the second radius of curvature can be the same as a limit range of the first radius of curvature, or can be slightly adjusted.

Figure 8:
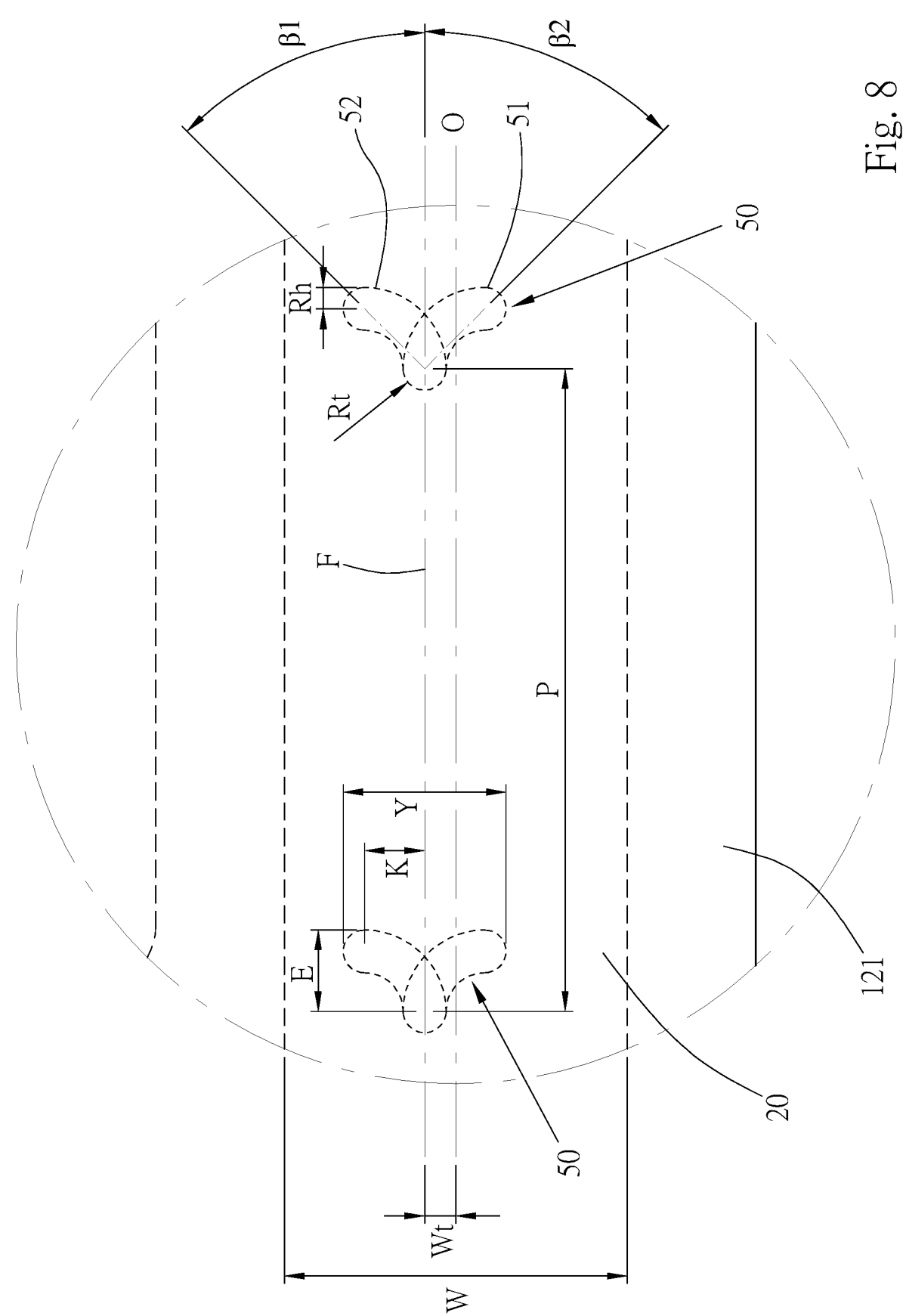
FIG. 8 is a partial enlarged view of FIG. 1.
Figure 13:
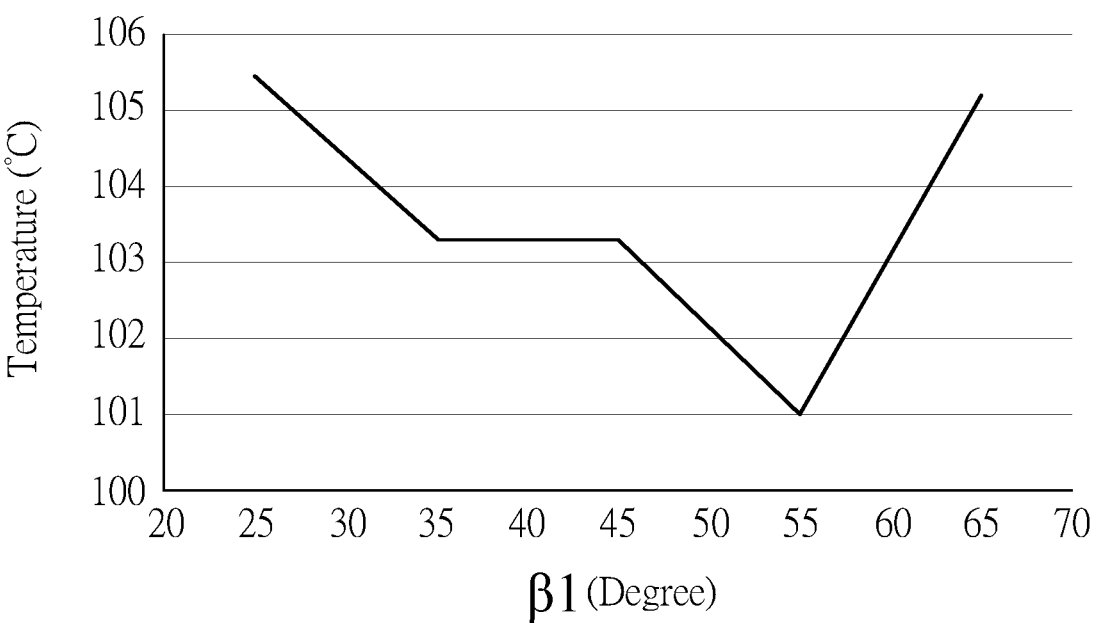
FIG. 13 is experimental data, which shows heat dissipation effect of the first protrusion at different angles.

As shown in FIG. 8, a first included angle (β1) is provided between a connection line between the first end (513) of the first protrusion (51) and the second end (515) of the first protrusion (51) and the imaginary line (F) of a geometric center of an overlap part between the first protrusion (51)

and the second protrusion (52) extending along the second axis (Y). Taking the first included angle (β1) as an example, a test is carried out. Wherein β1=45° being a control group, and other different angles being experimental groups. The experimental results are shown in FIG. 13. When β1≤35°, temperature increases; when the included angle β1≥65°, temperature is also higher than that of the control group. Accordingly, the first included angle (β1) is defined as between 35° and 65°.

Furthermore, a second included angle (β2) is provided between a connection line between the first end (523) of the second protrusion (52) and the second end (525) of the second protrusion (52) and the imaginary line (F) of a geometric center of an overlap part between the first protrusion (51) and the second protrusion (52) extending along the second axis (Y), and similarly the second included angle (β2) is between 35° and 65°.

Figure 14:
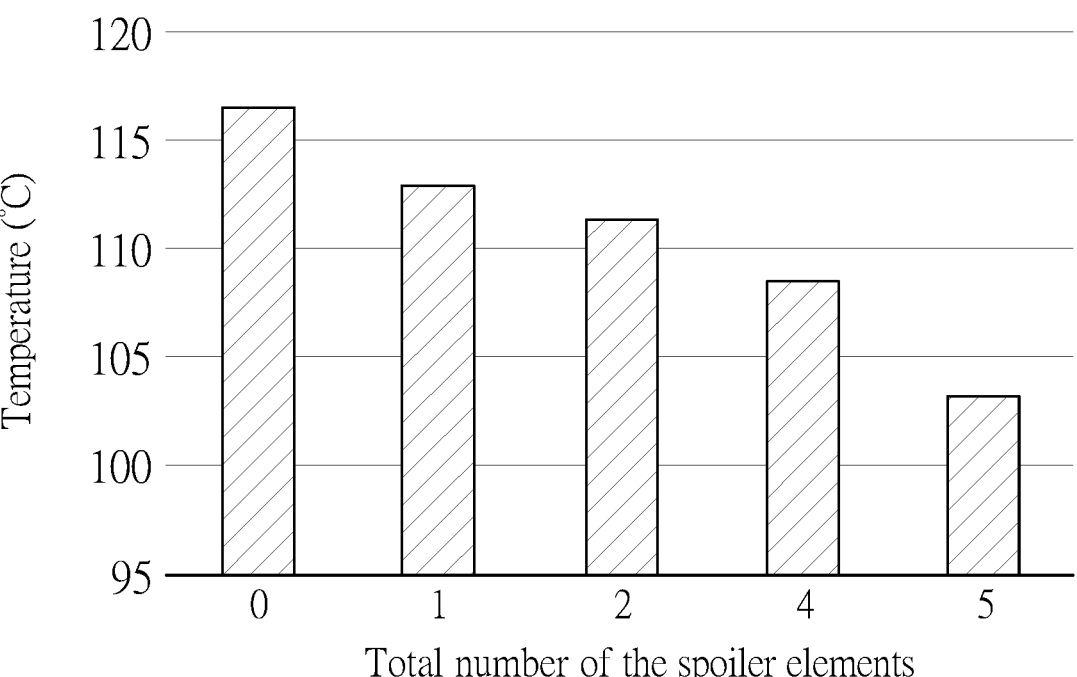
FIG. 14 is experimental data, which shows heat dissipation effect under different quantities of the spoiler element.
Figure 15:
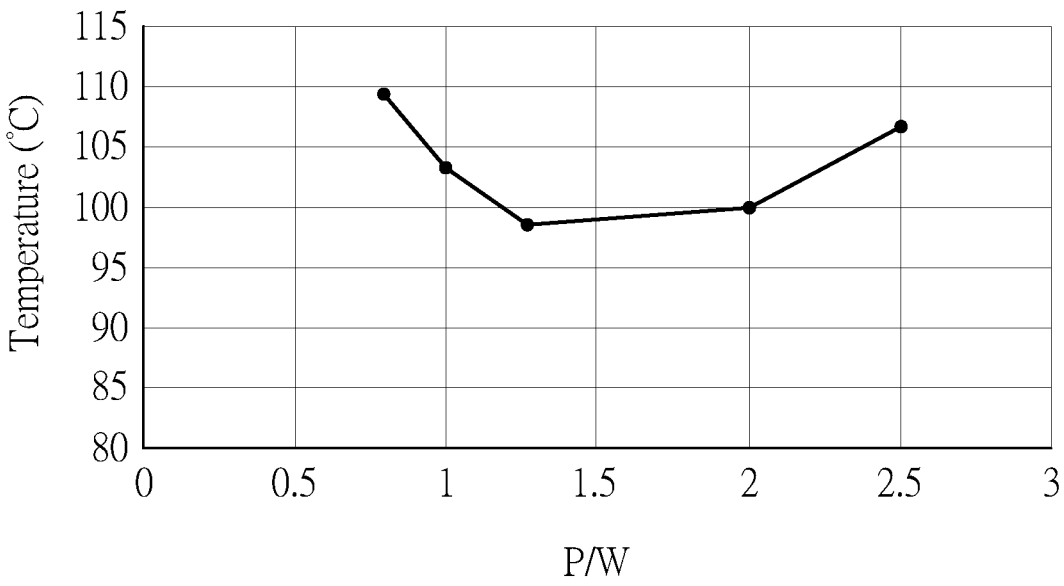
FIG. 15 is experimental data, which shows heat dissipation effect of the two adjacent spoiler elements at different distances.

In addition, according to the experimental results shown in FIG. 14, the more spoiler elements (50) configured in the flow channel (20), the better a heat dissipation effect. Furthermore, according to the experimental results shown in FIG. 15, when a ratio between a distance (P) between any of the two adjacent spoiler elements (50) along the second axis (Y) and the width (W) of the flow channel (20)≥1, temperature begins to have a downward trend; and when P/W≥2, temperature begins to have an upward trend. Furthermore, if the distance (P) is too large, it may reduce a total number of the spoiler elements (50) and affect a spoiler effect. The distance (P) and the width (W) of the flow channel (20) satisfy the following formula (6):

$$1 \leq P/W \leq 2. \tag{6}$$

Through the above structural description, specific usage situations of the invention are as follows.

Figure 1A:
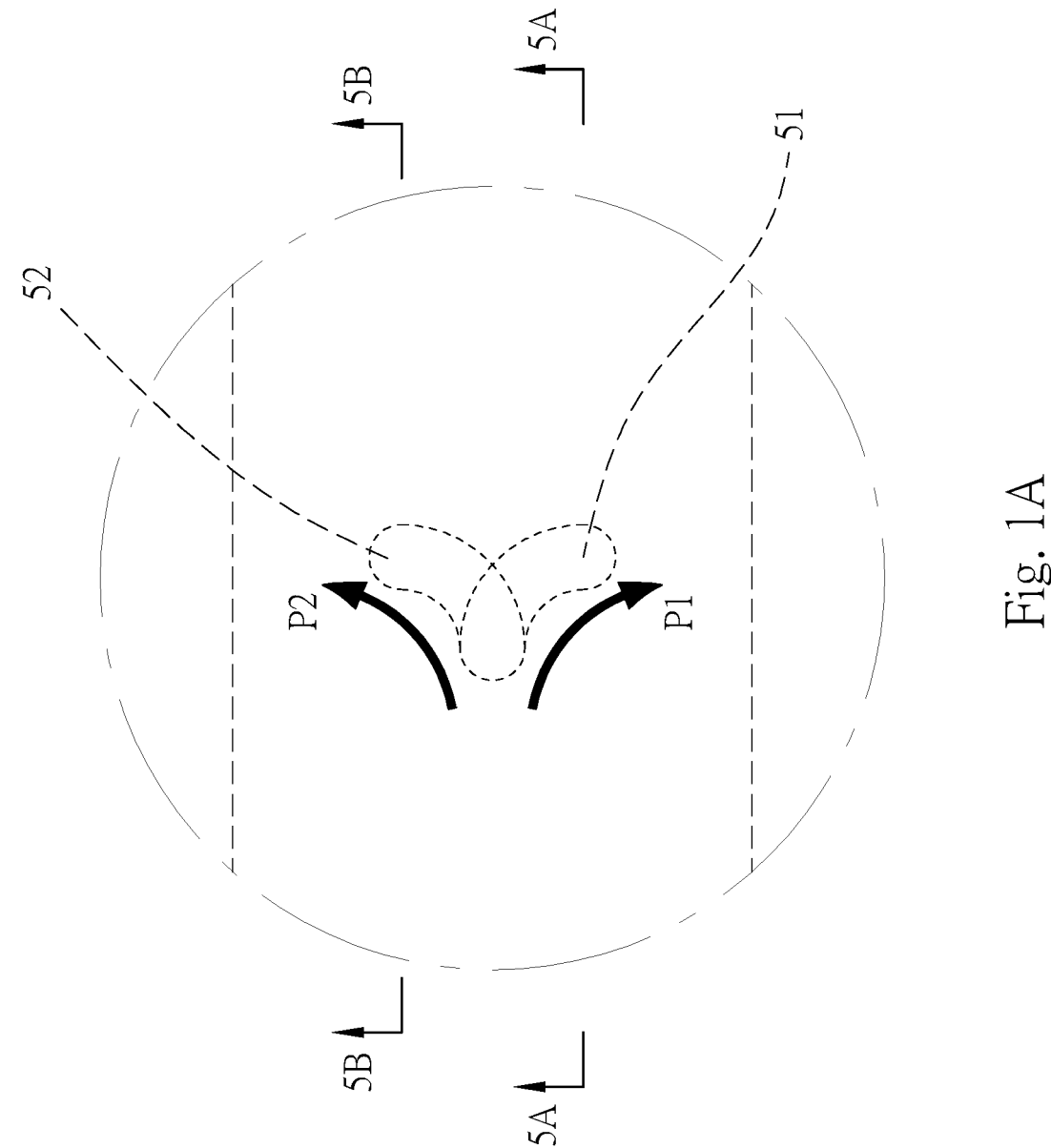
FIG. 1A is a partial enlarged view of a single spoiler element in FIG. 1.
Figure 2:
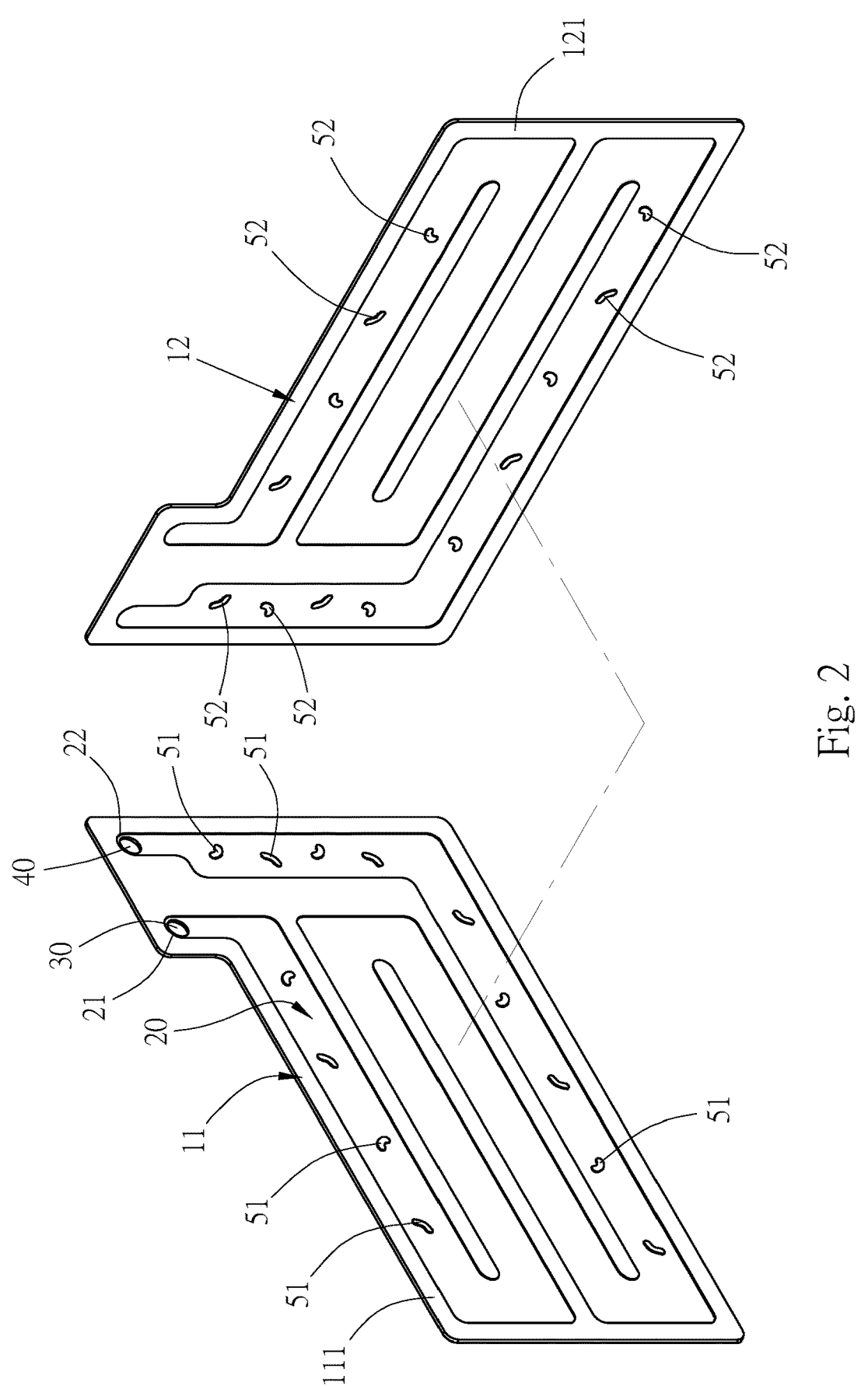
FIG. 2 is an exploded perspective view of FIG. 1.

Firstly, as shown in FIG. 1A, when an external cooling fluid flows through an overlapping part between the first protrusion (51) and the second protrusion (52), the external cooling fluid is obstructed and diverted, forming a first transverse turbulence (P1) and a second transverse turbulence (P2) in directions of the second axis (Y) and the third axis (X).

Figure 5:
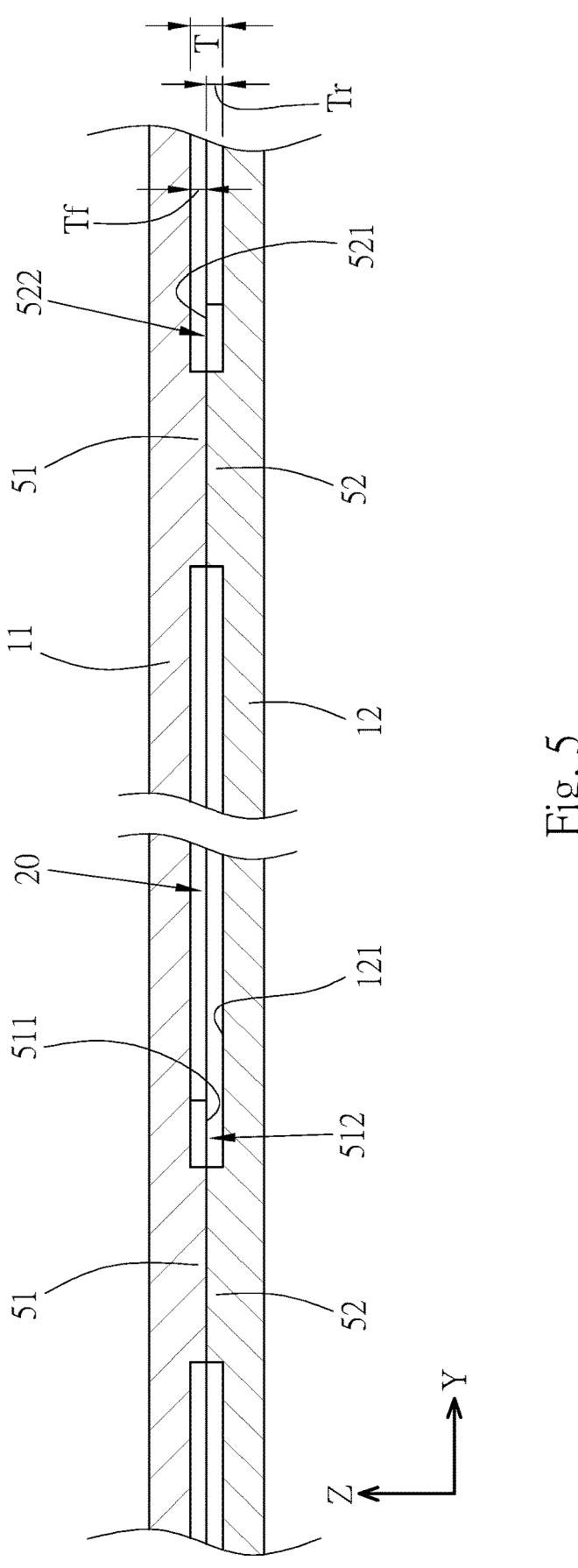
FIG. 5 is a cross-sectional view along section line 5-5 of FIG. 1.
Figures 5A, 5B:
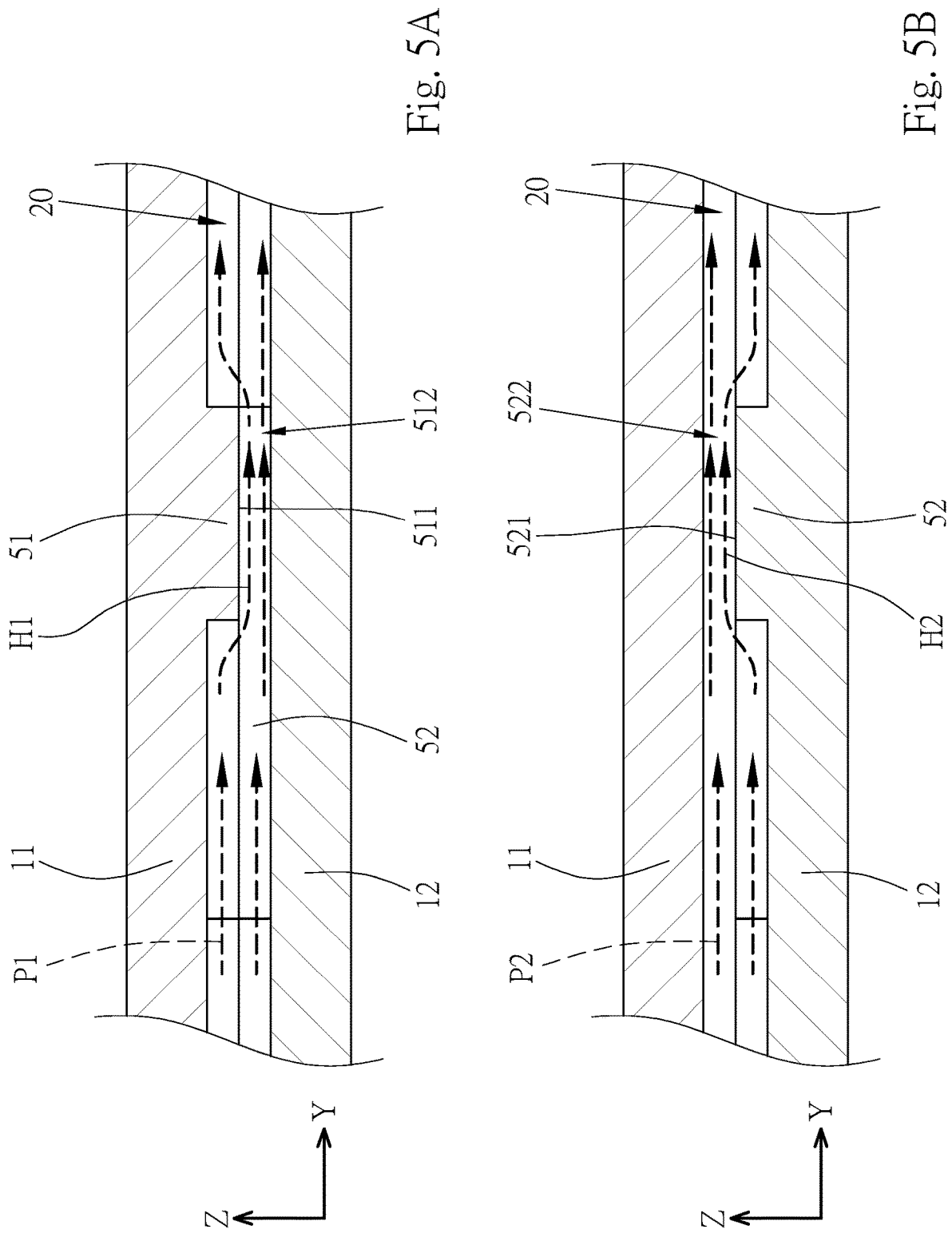
FIG. 5A is a cross-sectional view along section line 5A-5A of FIG. 1A.
FIG. 5B is a cross-sectional view along section line 5B-5B of FIG. 1A.

Then, a part of the first transverse turbulence (P1) is separated from the second transverse turbulence (P2) along the first flow guide plane (516) of the first protrusion (51); along a contour shape of the extended end (511) of the first protrusion (51), another part of the first transverse turbulence (P1) changes distribution positions of the external cooling fluid in the flow channel (20) on the first axis (Z), and flows into the first flow guide space (512) to form a first longitudinal turbulence (H1) in a direction of the first axis (Z), as shown in FIG. 5A.

A part of the second transverse turbulence (P2) is separated from the first transverse turbulence (P1) along the first flow guide plane (526) of the second protrusion (52); along a contour shape of the extended end (521) of the second protrusion (52), another part of the second transverse turbulence (P2) changes distribution positions of the external cooling fluid in the flow channel (20) on the first axis (Z), and flows into the second flow guide space (522) to form a second longitudinal turbulence (H2) in a direction of the first axis (Z), as shown in FIG. 5B.

Figure 18:
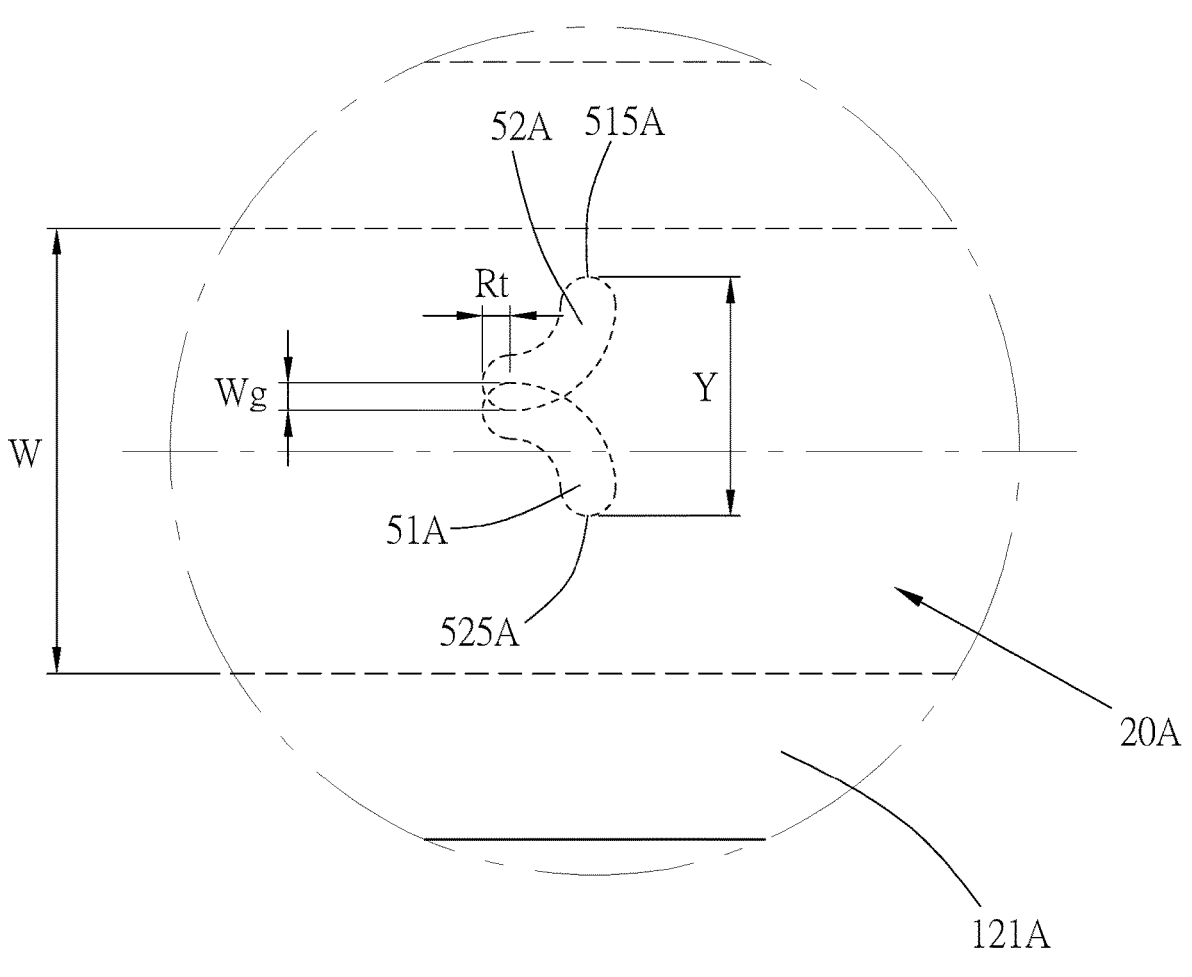
FIG. 18 is a schematic diagram of the spoiler element and the flow channel according to a second embodiment of the invention.

FIG. 18 is a second embodiment of the invention. A difference between the second embodiment and the first embodiment is that a forward projection of the first circular structure of the first protrusion (51A) on the second end face (121A) partially overlaps with the first circular structure of the second protrusion (52A). In other words, a forward projection of the first circular structure of the first protrusion (51A) on the second end face (121A) along the first axis (Z) is in tangent with the first circular structure of the second protrusion (52A), and a distance (Wg) between centers of curvature of the first circular structures, and the radius (Rt) of the first circular structure satisfy the following formula (7):

$$Wg \leq 2 * Rt - 1, \text{ and } Wg \text{ is not } 0. \tag{7}$$

Furthermore, a distance (Y) between the second end (515A) of the first protrusion (51A) and the second end (525A) of the second protrusion (52A), the width (W) of the flow channel (20A), the radius (Rt) of the first circular structure, and the distance (Wg) between centers of curvature of the first circular structures satisfy the following formula (8):

$$2 * Rt + Wg \leq Y \leq W. \tag{8}$$

Figure 19:
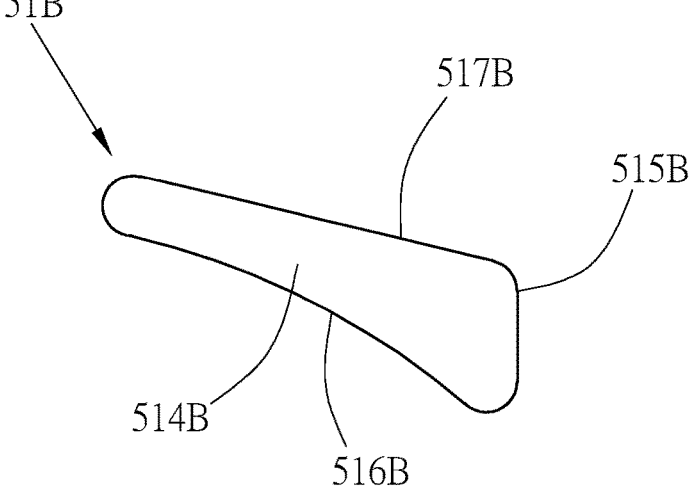
FIG. 19 is a schematic diagram of the first protrusion according to a third embodiment of the invention.

A difference between a third embodiment of the invention and the first embodiment lies in changes in a shape of the spoiler element (50). In FIG. 19, the first protrusion (51B) is taken as an example. The second end (515B) of the first protrusion (51B) forms a rectangular structure on a cross section of the second axis (Y), the second flow guide plane (517B) extends along a straight line, and the first flow guide plane (516B) extends in an arc. A shape design of the second protrusion is the same as that of the first protrusion (51B), so no further description will be provided.

Figures 20, 21:
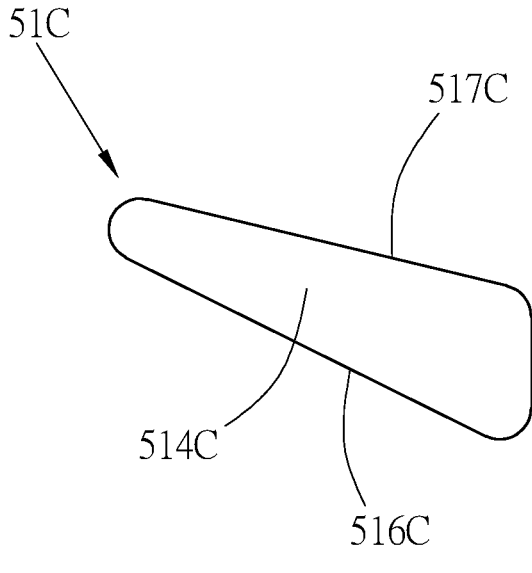
FIG. 20 is a schematic diagram of the first protrusion according to a fourth embodiment of the invention.
FIG. 21 is a schematic diagram of the flow channel according to a fifth embodiment of the invention.

FIG. 20 shows a fourth embodiment of the invention. A difference between the fourth embodiment and the third embodiment lies in both the first flow guide plane (516C) and the second flow guide plane (517C) extend along a straight line.

FIG. 21 shows a fifth embodiment of the invention. A difference between the fifth embodiment and the first embodiment lies in the flow channel (20D) comprises a first linear section (23) and a second linear section (24) adjacent connected to the first linear section (23). The first linear section (23) extends along a direction of the second axis (Y), and a direction in which the second linear section (24) extends has a deflection angle (θ) relative to the second axis (Y). When the deflection angle (θ), a length (L1) of the first linear section (23), a length (L2) of the second linear section (24), and the width (W) of the flow channel (20D) satisfy the following formula (9), then the spoiler element (50) (not shown in the figure) is enabled to be located in the first linear section (23) or the second linear section (24);

$$\theta < 3°, L1 + L2 \geq W. \tag{9}$$

Figure 22:
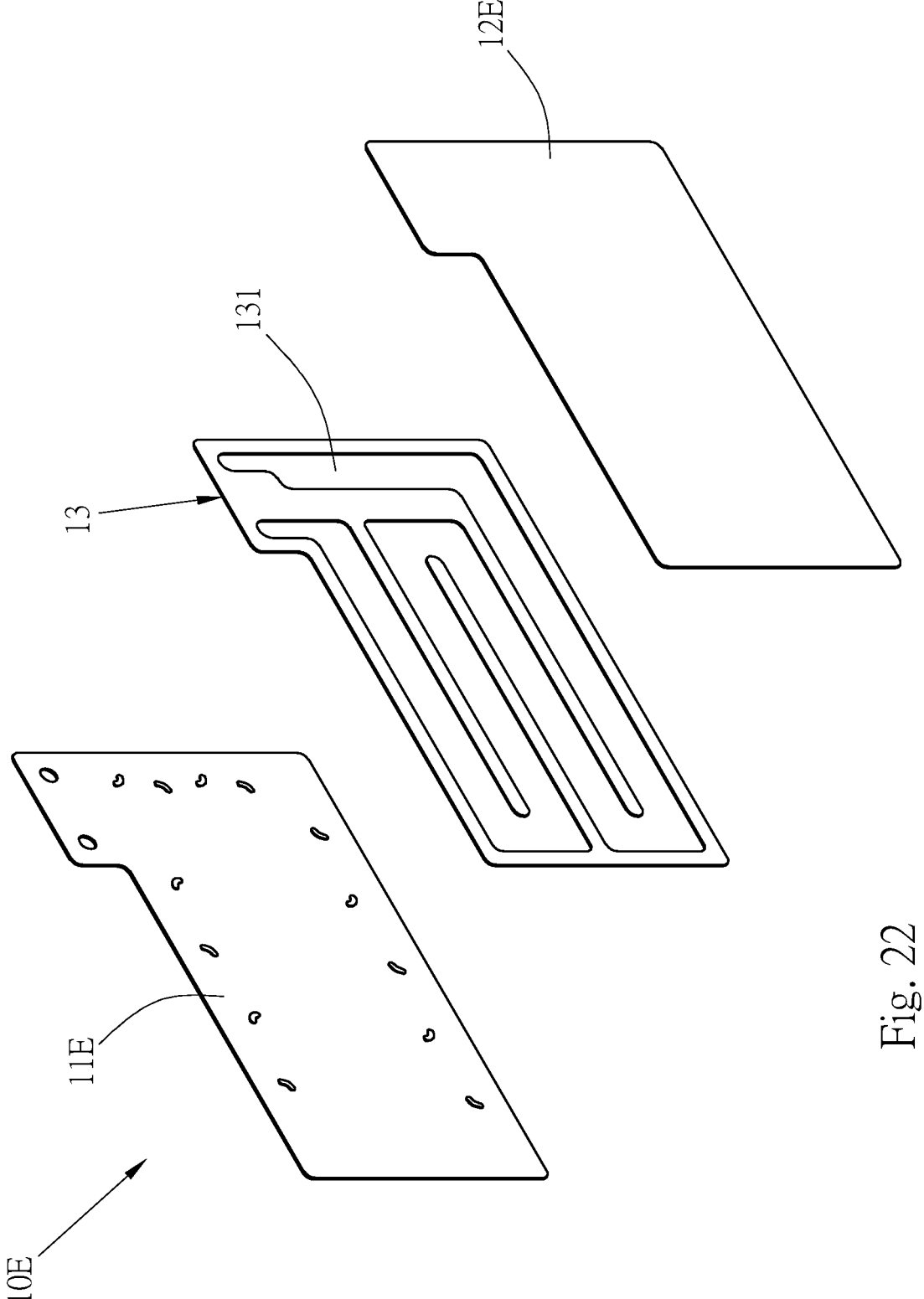
FIG. 22 is an exploded perspective view of a main body according to a sixth embodiment of the invention.

FIG. 22 shows a sixth embodiment of the invention. A difference between the sixth embodiment and the first embodiment lies in the main body (10E) further comprises a third plate part (13) provided between the first plate part (11E) and the second plate part (12E), and a hollow area (131) is provided on the third plate part (13), and the flow channel (20) (not shown in the figure) is defined by the hollow area (131), the first end face (111E) and the second end face (121E).

Although the invention has been disclosed as above with the embodiments, it is not intended to limit the invention. A person having ordinary skill in the art to which the invention pertains can make various changes and modifications without departing from the spirit and scope of the invention. Therefore, scope of protection of the invention shall be subject to what is defined in the pending claims.

What is claimed is:

1. A linear motor cooling module comprising:
   a main body having a first plate part and a second plate part, and a first end face of the first plate part and a second end face of the second plate part overlapping with each other in opposite directions along a direction of a virtual first axis;
   a flow channel provided in the main body, a shape of the flow channel being defined between the first end face and the second end face, and the flow channel having a predetermined height (T) on the first axis; and
   at least one spoiler element located in the flow channel and having a first protrusion and a second protrusion, the first protrusion protruding from the first end face and extending with a first height ($t_f$) toward the second end face along a direction of the first axis, and a first flow guide space being formed between an extended end of the first protrusion and the second end face, forward projections of the second protrusion and the first protrusion on the second end face along the first axis being protrudingly disposed on the second end face in a partially staggered manner, and the second protrusion extending with a second height ($t_r$) toward the first end face along a direction of the first axis, and a second flow guide space being formed between an extended end of the second protrusion and the first end face; wherein a sum of the first height ($t_f$) and the second height ($t_r$) is less than or equal to the height (T) of the flow channel; wherein contour shapes of the first protrusion and the second protrusion are symmetrical to each other, and the first protrusion and the second protrusion respectively comprise a first end, a second end and a connecting portion between the first end and the second end, a forward projection of the first end of the first protrusion on the second end face partially overlaps with the first end of the second protrusion, a forward projection of the second end of the first protrusion on the second end face and the second end of the second protrusion are staggered from each other, and a first flow guide plane is respectively provided at two back end sides of the first protrusion and the second protrusion.

2. The linear motor cooling module as claimed in claim 1, wherein the flow channel further has a predetermined length (L) on a virtual second axis, and a predetermined width (W) on a virtual third axis, provided for an external cooling fluid to flow in the flow channel, the second axis and the third axis are perpendicular to the first axis respectively, and the second axis and the third axis are parallel to a plane formed by the first end face or the second end face respectively.

3. The linear motor cooling module as claimed in claim 2, wherein a first included angle is provided between a connection line between the first end of the first protrusion and the second end of the first protrusion and an imaginary line of a geometric center of an overlap part between the first protrusion and the second protrusion extending along the second axis, and the first included angle is between 35° and 65°, a second included angle is provided between a connection line between the first end of the second protrusion and the second end of the second protrusion and an imaginary line of a geometric center of an overlap part between the first protrusion and the second protrusion extending along the second axis, and the second included angle is between 35° and 65°.

4. The linear motor cooling module as claimed in claim 2, wherein the first end of the first protrusion and the first end of the second protrusion are respectively a first circular structure on a cross section of the second axis, and the first circular structures have a same radius (Rt), and the radius (Rt) and the width (W) of the flow channel satisfy the following formula:

$$Rt/W \leqq 18\%, \text{ and } Rt \geqq 0.5 \text{ mm}.$$

5. The linear motor cooling module as claimed in claim 4, wherein a forward projection of the first circular structure of the first protrusion on the second end face along the first axis is in tangent with the first circular structure of the second protrusion, and a distance (Wg) between centers of curvature of the first circular structures, and the radius (Rt) of the first circular structure satisfy the following formula:

$$Wg \leqq 2 * Rt - 1,$$

and Wg is not 0.

6. The linear motor cooling module as claimed in claim 4, wherein a distance (Y) between the second end of the first protrusion and the second end of the second protrusion, the width (W) of the flow channel, the radius (Rt) of the first circular structure, and the distance (Wg) between centers of curvature of the first circular structures satisfy the following formula:

$$2 * Rt + Wg \leqq Y \leqq W.$$

7. The linear motor cooling module as claimed in claim 2, wherein the spoiler element is located in a section where the length (L) of the flow channel extending in a direction of the second axis being greater than or equal to the width (W) of the flow channel.

8. The linear motor cooling module as claimed in claim 2, wherein the flow channel comprises a first linear section and a second linear section adjacent connected to the first linear section, the first linear section extends along a direction of the second axis, and a direction in which the second linear section extends has a deflection angle ($\theta$) relative to the second axis, when the deflection angle ($\theta$), a length (L1) of the first linear section, a length (L2) of the second linear section, and the width (W) of the flow channel satisfy the following formula, then the spoiler element is enabled to be located in the first linear section or the second linear section;

$$\theta < 3°, L1 + L2 \geqq W.$$

9. The linear motor cooling module as claimed in claim 2, wherein a distance (Wt) between a geometric center of an overlap part between the first protrusion and the second protrusion and a center line of the flow channel parallel to the second axis, and the width (W) of the flow channel satisfy the following formula:

$$0\% \leqq Wt/W \leqq 15\%.$$

10. The linear motor cooling module as claimed in claim 2, wherein a distance (K) between the second end of the first protrusion and an imaginary line of a geometric center of an overlap part between the first protrusion and the second protrusion extending along the second axis, and a minimum distance (E) between the first end and the second end of the first protrusion along the second axis satisfy the following formula:

$$E/K \geqq 1.$$

11. The linear motor cooling module as claimed in claim 2, wherein a spacing (G) between the extended end of the first protrusion and the extended end of the second protrusion on the first axis, the first height ($t_f$), the second height ($t_r$) and the height (T) of the flow channel satisfy the following formula:

$$G = T - (t_f + t_r), \text{ and } G \text{ can be } 0.$$

12. The linear motor cooling module as claimed in claim 2, wherein the first height ($t_f$), the second height ($t_r$) and the height (T) of the flow channel satisfy the following formula:

$$tf \geqq 0.2 * T, tr \geqq 0.2 * T, \alpha = \frac{t_f + t_r}{T}, \text{ and } \alpha \text{ is between } 0.4 \sim 1.$$

13. The linear motor cooling module as claimed in claim 2, wherein a quantity of the spoiler element is two, and a distance (P) between the two spoiler elements along the second axis and the width (W) of the flow channel satisfy the following formula:

$$1 \leqq P/W \leqq 2.$$

\* \* \* \* \*